Feb. 12, 1924.
R. H. CADENHEAD
PLOW
Filed Feb. 2, 1923
1,483,776
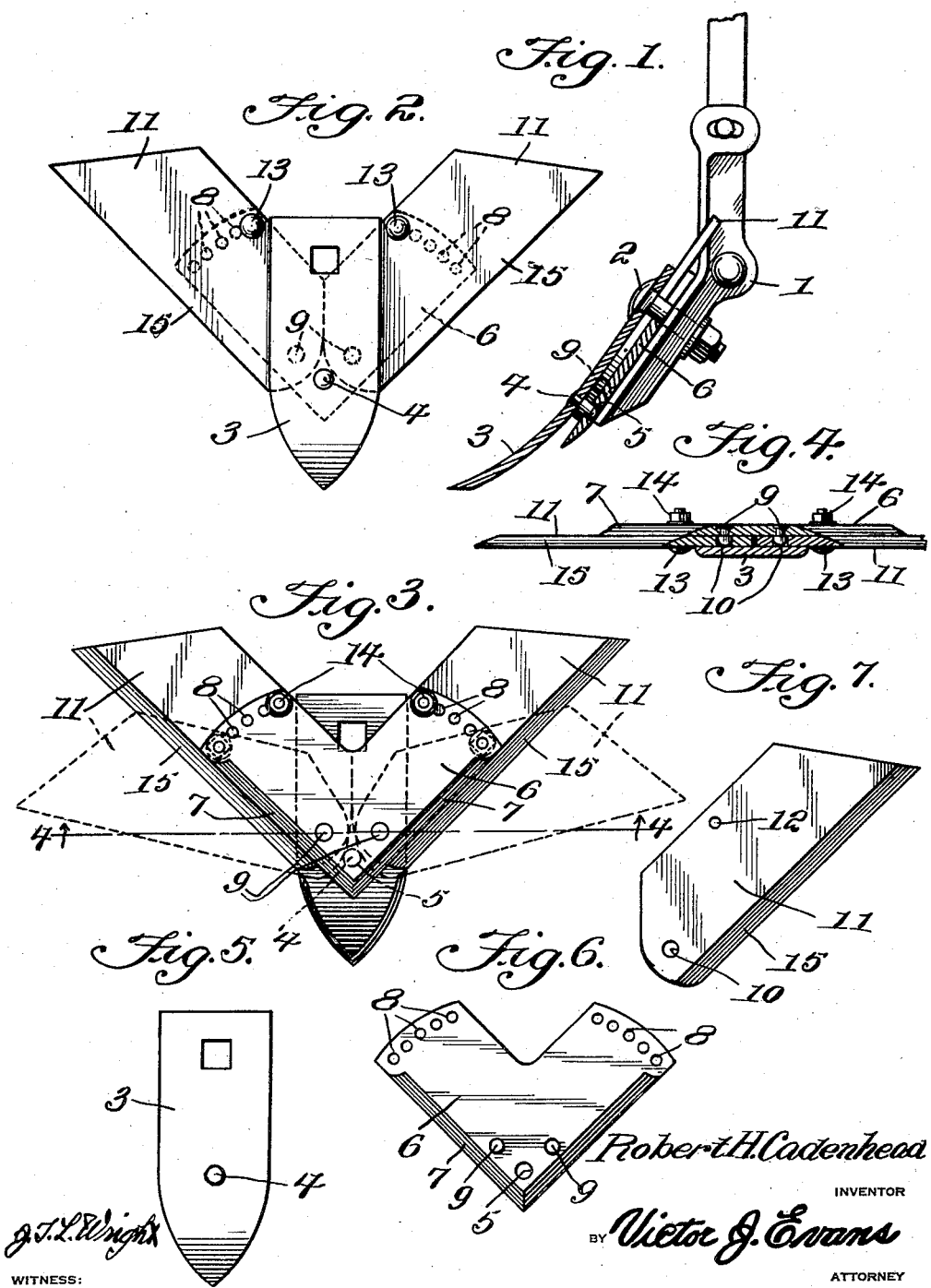

Patented Feb. 12, 1924.

1,483,776

UNITED STATES PATENT OFFICE.

ROBERT H. CADENHEAD, OF BROWNWOOD, TEXAS.

PLOW.

Application filed February 2, 1923. Serial No. 616,530.

*To all whom it may concern:*

Be it known I, ROBERT H. CADENHEAD, a citizen of the United States, residing at Brownwood, in the county of Brown and State of Texas, have invented new and useful Improvements in Plows, of which the following is a specification.

My invention has reference to a plow attachment, and has for its primary object to simplify and improve the construction upon which I have been granted U. S. Letters Patent No. 926,544, dated June 29, 1909.

The invention further resides in the novel construction, combination and operative arrangement of parts whereby sweeps or blades are attached to and angularly adjustable upon a plow blade.

With the foregoing and other objects in view, the invention resides in the construction, combination and operative arrangement of parts such as is disclosed by the drawing which accompanies and which forms part of this application.

In the drawing:—

Figure 1 is a side elevation of a cultivator foot with the improvement attached thereto, parts being in section.

Figure 2 is a front elevation of the device removed from the foot.

Figure 3 is a rear plan view thereof.

Figure 4 is a sectional view on the line 4—4 of Figure 3.

Figure 5 is a plan view of the shovel plow of a cultivator.

Figure 6 is a plan view of the V-shaped member employed.

Figure 7 is a similar view of one of the sweep blades.

In the drawing the numeral 1 designates a cultivator foot to which is attached by the usual bolt 2 a plow blade 3. The portion of the bolt that passes through the plow blade is square or rectangular, and the blade is centrally provided with an inwardly extending lug 4 that passes through an opening 5 adjacent to the pointed end of a V-shaped plate 6. The plate has its outer edges sharpened, as at 7, its arms, adjacent to the ends thereof provided with spaced apertures 8. The plate, to the rear and to the sides of the opening 5 therethrough has projecting lugs 9, and these lugs are received in openings 10 in the sweep blades 11. Each sweep blade has adjacent its inner and non-sharpened edge an opening 12 designed to align with one of the spaced openings 8 in the plate 6, and passing through these aligning openings there is a bolt 13 engaged by a suitable nut 14.

By reference to Figures 2 and 3 of the drawing it will be seen that the bolt 2 is in contacting engagement with the inner angle edges provided by the arms of the plate 6 so that the plate is effectively sustained on the plow blade 3, and also by reference to the dotted lines in Figure 3 of the drawing it will be seen that by removing the bolt 13 the blades 11 may be swung to desired angles at the sides of the plow blade 3. By reference to the said Figure 3 it will be noted from the full lines that the sharpened edges 15 of the blades 11 are arranged substantially at a similar angle to the cutting edges 7 of the plate 6, thus providing continuations of said edges.

Having described the invention, I claim:—

A plow foot having a plow blade secured thereon by a bolt and nut, said blade having a lug directed toward the foot, a substantially V-shaped plate having its outer edges sharpened and provided with an opening to receive the lug therethrough, and said V-shaped plate resting directly on the foot and having its arms at their inner edges contacted by the bolt, said V-shaped plate having a pair of spaced lugs thereon and having its arms adjacent their outer ends provided with a series of openings, sweep blades each of which being pivotally secured to one of the lugs of the V-shaped plate and having openings designed to register with the apertures in said V-shaped plate, and means adjustably securing said sweep blades to the arms of the said V-shaped plate.

In testimony whereof I affix my signature.

ROBERT H. CADENHEAD.